(12) United States Patent
Sung et al.

(10) Patent No.: US 10,553,849 B2
(45) Date of Patent: Feb. 4, 2020

(54) SEPARATOR AND ELECTROCHEMICAL DEVICE COMPRISING SAME

(71) Applicant: LG Chem, Ltd., Seoul (KR)

(72) Inventors: Dong-Wook Sung, Daejeon (KR); Min-Hyung Kim, Daejeon (KR); In-Hyouk Sung, Daejeon (KR); Hyun-Kyung Shin, Daejeon (KR); Ji-Eun Lee, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 26 days.

(21) Appl. No.: 15/743,500

(22) PCT Filed: Jul. 11, 2016

(86) PCT No.: PCT/KR2016/007532
§ 371 (c)(1),
(2) Date: Jun. 6, 2018

(87) PCT Pub. No.: WO2017/010780
PCT Pub. Date: Jan. 19, 2017

(65) Prior Publication Data
US 2018/0277815 A1 Sep. 27, 2018

(30) Foreign Application Priority Data
Jul. 10, 2015 (KR) .................. 10-2015-0098672

(51) Int. Cl.
*H01M 2/16* (2006.01)
*H01M 10/0525* (2010.01)

(52) U.S. Cl.
CPC ......... *H01M 2/1686* (2013.01); *H01M 2/166* (2013.01); *H01M 2/1653* (2013.01); *H01M 10/0525* (2013.01)

(58) Field of Classification Search
CPC ...... H01M 2/16; H01M 2/1653; H01M 2/166; H01M 2/1686; H01M 10/052; H01M 10/0525; Y02E 60/122; Y02T 10/7011
See application file for complete search history.

(56) References Cited

U.S. PATENT DOCUMENTS

2004/0161620 A1   8/2004  Tanaka et al.
2013/0149587 A1   6/2013  Yu et al.
(Continued)

FOREIGN PATENT DOCUMENTS

EP   2662920 A2    11/2013
JP   2008210541 A   9/2008
(Continued)

OTHER PUBLICATIONS

Extended European Search Report for Application No. EP16824697.3 dated Mar. 13, 2018.
(Continued)

*Primary Examiner* — Brittany L Raymond
(74) *Attorney, Agent, or Firm* — Lerner, David, Littenberg, Krumholz & Mentlik, LLP

(57) ABSTRACT

Disclosed are a separator and an electrochemical device comprising the same, the separator comprising: a porous substrate having a plurality of pores; and a porous coating layer formed on at least one surface of the porous substrate or at least one surface of the porous substrate and a portion of the pore, the porous coating layer containing a plurality of inorganic particles and a binder polymer disposed on a part or the entirety of a surface of the inorganic particle to connect and fix the inorganic particles, wherein the inorganic particle comprises an alumina particle and an aluminum hydroxide particle having a smaller average particle diameter than the alumina particle.

10 Claims, 3 Drawing Sheets

(56) References Cited

U.S. PATENT DOCUMENTS

| | | | |
|---|---|---|---|
| 2013/0280584 A1 | 10/2013 | Matsumura | |
| 2014/0295170 A1 | 10/2014 | Kim et al. | |
| 2015/0030933 A1 | 1/2015 | Goetzen et al. | |
| 2015/0270522 A1 | 9/2015 | Yamada et al. | |
| 2015/0295216 A1* | 10/2015 | Okuno | H01M 2/1653 320/128 |

FOREIGN PATENT DOCUMENTS

| | | |
|---|---|---|
| JP | 4311208 B2 | 8/2009 |
| KR | 20120079515 A | 7/2012 |
| KR | 20120124239 A | 11/2012 |
| KR | 20130007740 A | 1/2013 |
| KR | 20140116415 A | 10/2014 |
| WO | 2007094641 A1 | 8/2007 |
| WO | 2013066012 A1 | 5/2013 |
| WO | 2013069383 A1 | 5/2013 |
| WO | 2014046094 A1 | 3/2014 |

OTHER PUBLICATIONS

Search report from International Application No. PCT/KR2016/007532, dated Oct. 25, 2016.

\* cited by examiner

SEPARATOR AND ELECTROCHEMICAL
DEVICE COMPRISING SAME

CROSS-REFERENCE TO RELATED APPLICATIONS

The present application is a national phase entry under 35 U.S.C. § 371 of International Application No. PCT/KR2016/007532 filed Jul. 11, 2016, which claims priority to Korean Patent Application No. 10-2015-0098672 filed in the Republic of Korea on Jul. 10, 2015, the disclosures of which are incorporated herein by reference.

TECHNICAL FIELD

The present disclosure relates to a separator and an electrochemical device comprising the same, and more particularly, to a separator with enhanced thermal shrinkage and an electrochemical device comprising the same.

BACKGROUND ART

Recently, there has been an increasing interest in energy storage technology day by day. As the application field of energy storage technology has been extended to mobile phones, camcorders, lap-top computers, and even electric cars, many efforts have been devoted to studying and developing electrochemical devices. In this aspect, electrochemical devices are attracting more attention, and especially, development of rechargeable secondary batteries is the focus of attention, and more recently, in the development of such batteries, new electrode and battery design to improve capacity density and specific energy are mainly studied and developed.

In the currently available secondary batteries, lithium secondary batteries developed in early 1990's have higher operating voltage and much higher energy density than traditional batteries using an aqueous electrolyte solution such as Ni-MH batteries, Ni—Cd batteries and $H_2SO_4$—Pb batteries, and by virtue of these advantages, lithium secondary batteries are gaining much attention. However, the downside of lithium ion batteries is that they have safety problem such as fires and explosion caused by the use of organic electrolyte solutions and they are complicated in manufacturing.

Novel lithium ion polymer batteries evolved from lithium ion batteries are considered one of the next-generation batteries, but lower capacity than lithium ion batteries and insufficient discharge capacity, especially, at low temperatures are issues that must be urgently solved.

Electrochemical devices are produced by many manufacturers, and each shows different safety characteristics. Assessment and management of the safety of electrochemical batteries is very grave. The most important consideration is that electrochemical devices should not cause injury to users in the event of malfunction, and for this purpose, Safety Regulations strictly prohibit fire and flame in electrochemical devices. In the safety characteristics of electrochemical devices, overheating and eventual thermal runaway in electrochemical devices or piercing of separators poses a high risk of explosion. Particularly, polyolefin-based porous substrates commonly used for separators of electrochemical devices show extremely severe thermal contraction behaviors at the temperature of 100° C. or above due to their properties of materials and manufacturing processes including stretching, causing a short circuit between positive and negative electrodes.

To solve the safety problem of electrochemical devices, a separator having a porous organic-inorganic coating layer has been proposed, in which the porous organic-inorganic coating layer is formed by coating a mixture of inorganic particles in excess and a binder polymer on at least one surface of a porous substrate having a plurality of pores.

When particles having a very large particle size are used in the separator having a porous organic-inorganic coating layer, thermal contraction control was difficult, and when particles having a very small particle size are used, a coating layer-forming composition reduces in stability or processability, making it difficult to use.

DISCLOSURE

Technical Problem

The present disclosure is directed to providing a separator that exhibits enhanced stability with minimizing thermal contraction.

The present disclosure is further directed to providing an electrochemical device comprising the separator.

Technical Solution

To achieve the object, according to an aspect of the present disclosure, there is provided a separator of the following embodiments.

A first embodiment is drawn toward a separator including a porous substrate having a plurality of pores, and a porous coating layer formed on at least one surface of the porous substrate or on at least one surface of the porous substrate and some of the pores, the porous coating layer comprising a plurality of inorganic particles and a binder polymer disposed on part or all of the inorganic particles' surface to connect and immobilize the inorganic particles, wherein the inorganic particles comprise alumina particles and aluminum hydroxide particles having a smaller average particle size than the alumina particles.

A second embodiment is drawn toward the separator according to the first embodiment, wherein an average particle size of the aluminum hydroxide particles is as small as 0.01 to 0.9 of an average particle size of the alumina particles.

A third embodiment is drawn toward the separator according to the first or second embodiment, wherein the average particle size of the alumina particles is 0.5 to 3 μm.

A fourth embodiment is drawn toward the separator according to one of the first to third embodiments, wherein the average particle size of the aluminum hydroxide particles is 0.05 to 0.4 μm.

It is drawn toward the separator, wherein a content ratio between the alumina particles and the aluminum hydroxide particles is from 50:50 to 97:3.

A fifth embodiment is drawn toward the separator according to one of the first to fourth embodiments, wherein the aluminum hydroxide particles are at least one selected from the group consisting of boehmite (γ-AlO(OH)), pseudoboehmite ($Al_2O_3 \cdot H_2O$), diaspore (α-AlO(OH)), bayerlite (α-$AlO(OH)_3$), gibbsite (γ-$AlO(OH)_3$), and nordstrandite ($AlO(OH)_3$).

A sixth embodiment is drawn toward the separator according to one of the first to fifth embodiments, wherein the porous substrate is a polyolefin-based porous substrate.

A seventh embodiment is drawn toward the separator according to the sixth embodiment, wherein the polyolefin-based porous substrate is formed of at least one polymer selected from the group consisting of polyethylene, polypropylene, polybutylene, and polypentene.

An eighth embodiment is drawn toward the separator according to one of the first to seventh embodiments, wherein the porous substrate has a thickness of 5 to 50 μm, a pore size of 0.01 to 50 μm, and a porosity of 10 to 95%.

A ninth embodiment is drawn toward the separator according to one of the first to eighth embodiments, wherein a weight ratio between the inorganic particles and the binder polymer is from 50:50 to 99:1.

A tenth embodiment is drawn toward the separator according to one of the first to ninth embodiments, wherein the binder polymer is at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

According to another aspect of the present disclosure, there is provided an electrochemical device of the following embodiments.

An eleventh embodiment is drawn toward an electrochemical device including a positive electrode, a negative electrode, and a separator interposed between the positive electrode and the negative electrode, wherein the separator is defined in one of the first to tenth embodiments.

A twelfth embodiment is drawn toward the electrochemical device according to the eleventh embodiment, wherein the electrochemical device is a lithium secondary battery.

Advantageous Effects

According to an embodiment of the present disclosure, there is provided a separator with enhanced stability, in which the separator has a porous coating layer including inorganic particles having different sizes and materials, that is, alumina particles and aluminum hydroxide particles having a smaller particle size than the alumina particles, so that the thermal shrinkage properties of a porous substrate are greatly improved by the porous coating layer of the inorganic particles, and thus a short circuit between positive and negative electrodes that may occur when an electrochemical device is overheated can be prevented, and an electrochemical device comprising the same.

Furthermore, the use of aluminum hydroxide particles having relatively low density contributes to reduced weight of the separator and the electrochemical device, and can control a rapid internal temperature rise in the electrochemical device caused by malfunction because of good heat absorption properties of aluminum hydroxide particles.

MODE FOR CARRYING OUT THE INVENTION

Figure 1:
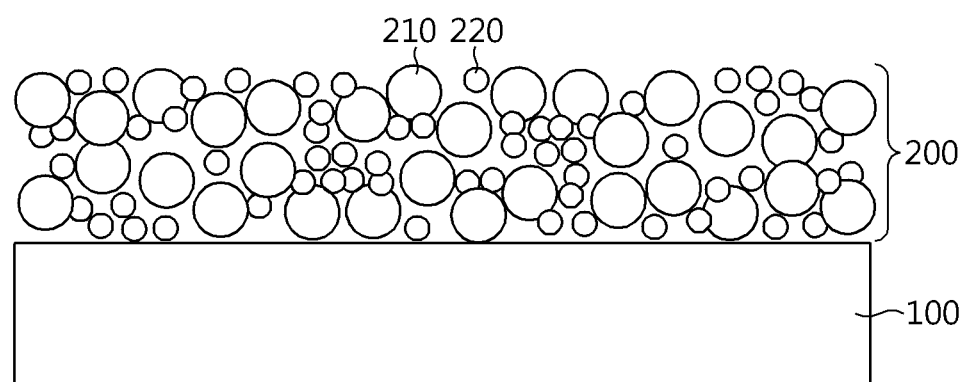
FIG. 1 is a schematic diagram showing a separator according to an embodiment of the present disclosure.

Hereinafter, the present disclosure will be described in detail. The terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A separator according to an aspect of the present disclosure includes a porous substrate having a plurality of pores; and a porous coating layer formed on at least one area of at least one surface of the porous substrate and the pores of the porous substrate, the porous coating layer including a plurality of inorganic particles and a binder polymer disposed on part or all of the inorganic particles' surface to connect and immobilize the inorganic particles, and the inorganic particles include alumina particles and aluminum hydroxide particles having a smaller average particle size than the alumina particles.

In the present disclosure, the inorganic particles include two types of inorganic particles having different average particle sizes and materials, alumina particles and aluminum hydroxide particles having a smaller average particle size than the alumina particles.

The average particle size of the aluminum hydroxide particles may be as small as 0.01 to 0.9 of the average particle size of the alumina particles, preferably 0.015 to 0.85, and more preferably 0.02 to 0.08.

According to an embodiment of the present disclosure, the average particle size of the alumina particles may be 0.5 to 3 Lm, preferably 0.7 to 2.7 μm, and more preferably 0.9 to 2.5 μm, and the average particle size of the aluminum hydroxide particles may be 0.05 to 0.4 μm, preferably 0.07 to 0.37 μm, and more preferably 0.09 to 0.35 μm.

Because the present disclosure includes two types of inorganic particles having different average particle sizes and different materials, dispersibility and coating processability of the inorganic particles in a porous coating layer-forming composition are improved, the thickness of the coating layer is easy to control, and degradation in the mechanical and electrical properties can be prevented. Moreover, small size particles can be situated in large spacing between large size particles, so the pore size of a formed porous coating layer can be controlled, the density of the porous coating layer increased, thereby inhibiting the thermal contraction of the porous substrate, and preventing an internal short circuit during charge and discharge.

Particularly, in the present disclosure, using alumina particles and aluminum hydroxide particles having a smaller average particle size than the alumina particles together provides a more advantageous effect than using two types of inorganic particles of the same material only different in size, and a detailed description is provided below.

The alumina particles are an aluminum/oxygen compound of formula $Al_2O_3$, and they are known as an electrical insulator having relatively high thermal conductivity, and have density of 3.95 to 4.1 $g/cm^3$.

On the other hand, the aluminum hydroxide particles include boehmite ($\gamma$-AlO(OH)) and diaspore ($\alpha$-AlO(OH)) having one hydroxyl group, and bayerlite ($\alpha$-Al(OH)$_3$), gibbsite ($\gamma$-Al(OH)$_3$), nordstrandite (Al(OH)$_3$) having two hydroxyl groups according to the type of hydroxyl group, and include pseudoboehmite ($Al_2O_3 \cdot H_2O$), or alumina hydrate. For the aluminum hydroxide particles, these may be used alone or in combination. The aluminum hydroxide particles generally have density in the range of about 2.4 to 3.1 $g/cm^3$.

Furthermore, the aluminum hydroxide particles have good heat absorption properties, and they may have a circular shape as well as a plate shape (foil shape), a needle shape (fibril shape), a polygonal plate shape extending over in the direction of predetermined crystallographic axes, for example, a hexagonal plate shape and a rectangular plate shape, and a spindle shape.

Accordingly, in addition to alumina particles as large size inorganic particles, when the porous coating layer of the present disclosure includes aluminum hydroxide particles having a smaller average particle size than the alumina particles and lower density than alumina together, the total weight of the separator reduces, contributing to reduced weight of an electrochemical device. Furthermore, the aluminum hydroxide particles may have various shapes including a spherical shape as well as a plate shape, so when the spherical alumina particles are arranged adjacent to each other or far apart from each other, the aluminum hydroxide particles can be easily arranged in the spacing of various shapes between the alumina particles. As a result, the density and mechanical properties of the porous coating layer are greatly improved, and thermal contraction of the porous substrate is suppressed, thereby preventing an internal short circuit in an electrochemical device.

Furthermore, if alumina particles having different average particle sizes, i.e., large size alumina particles and small size alumina particles are used, small size alumina particles are much more expensive than large size alumina particles and are difficult to handle, but the present disclosure uses alumina particles and aluminum hydroxide particles having a smaller average particle size than the alumina particles together to solve the problem.

Furthermore, according to an embodiment of the present disclosure, a content ratio between the alumina particles and the aluminum hydroxide particles may be 50:50 to 97:3, preferably 55:45 to 95:5, and more preferably 60:40 to 93:7.

When the content ratio satisfies the range, dispersion stability or processability of the coating composition for forming a porous coating layer is greatly improved, the porous coating layer can be formed with uniform thickness, and porosity control of the porous coating layer is made easy.

The porous substrate may be a porous polymer substrate, and specifically, may include a porous polymer film substrate or a porous polymer nonwoven substrate.

The porous polymer film substrate may include a porous polymer film made of polyolefin such as polyethylene and polypropylene, and the polyolefin porous polymer film substrate exerts a shutdown function, for example, at the temperature of 80 to 130° C.

In this instance, the polyolefin porous polymer film may be formed of polyolefin-based polymer such as polyethylene including high density polyethylene, linear low density polyethylene, low density polyethylene and ultra high molecular weight polyethylene, polypropylene, polybutylene, and polypentene, used singly or in combination.

Furthermore, the porous polymer film substrate may be manufactured by molding in film form using various polymers including polyester besides polyolefin. Furthermore, the porous polymer film substrate may be formed with a stack structure of two or more film layers, and each film layer may be formed of polymer including polyolefin and polyester mentioned above, used singly or in combination.

Furthermore, in addition to polyolefins such as those mentioned above, the porous polymer film substrate and the porous nonwoven substrate may be formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, used singly or in combination. The thickness of the porous substrate is not limited to a particular range, but is preferably from 1 to 100 μm, and more preferably from 5 to 50 μm, and the pore size and porosity in the porous substrate are also not limited to a particular range, but the pore size is preferably from 0.01 to 50 ran and the porosity is preferably from 10 to 95%.

In the separator according to an aspect of the present disclosure, the binder polymer used to form the porous coating layer may include polymer commonly used to form a porous coating layer in the art. Particularly, polymer having a glass transition temperature ($T_g$) of between −200 and 200° C. may be used, and this is because a porous coating layer finally formed can have improved mechanical properties including flexibility and elasticity. This binder polymer acts faithfully as a binder to connect and stably immobilize the inorganic particles, contributing to the prevention of mechanical property degradation in the separator having the porous coating layer.

Furthermore, the binder polymer does not necessarily have the ability to transport ion, but the use of polymer having the ability to transport ion can further improve the performance of an electrochemical device. Accordingly, the binder polymer may use those having a high dielectric constant as possible. In practice, a dissolution rate of salts in an electrolyte solution relies on a dielectric constant of an electrolyte solution solvent, and thus, as the dielectric constant of the binder polymer is higher, a dissolution rate of salts in an electrolyte is improved. The dielectric constant of the binder polymer may range from 1.0 to 100 (measured in frequency=1 kHz), and in particular, 10 or greater.

In addition to the aforementioned function, the binder polymer shows a high degree of swelling in electrolyte solution by gelation when impregnated with liquid electrolyte solution. Accordingly, the binder polymer have a solubility parameter, i.e., Hildebrand solubility parameter, ranging from 15 to 45 $MPa^{1/2}$ or from 15 to 25 $MP^{1/2}$ and from 30 to 45 $MPa^{1/2}$. Accordingly, hydrophilic polymers with polar groups may be used, rather than hydrophobic polymers such as polyolefins. When the solubility parameter is less than 15 $MP^{1/2}$ and exceeds 45 $MPa^{1/2}$, it will be difficult to be swollen by a general liquid electrolyte solution for batteries.

Non-limiting examples of the binder polymer include, but are not limited to, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

A weight ratio between the inorganic particles and the binder polymer preferably ranges, for example, from 50:50 to 99:1, and more preferably from 70:30 to 95:5. When the content ratio between the binder polymer and the inorganic particles satisfies the range, a high amount of binder polymer can prevent the pore size and porosity reduction of a coating layer to be formed, while solving the peel resistance reduction problem of the coating layer that occurs when the binder polymer content is low.

In addition to the inorganic particles and the polymer mentioned above, the separator according to an aspect of the present disclosure may further include additives, as the components of the porous coating layer.

The separator according to an embodiment of the present disclosure may be manufactured by preparing a porous coating layer-forming composition including inorganic particles and a binder polymer, coating the composition on at least one surface of a porous substrate, and drying it, and the inorganic particles include alumina particles and aluminum hydroxide particles having a smaller average particle size than the alumina particles.

First, the porous coating layer-forming composition may be prepared by dissolving a binder polymer in a solvent, and adding and dispersing inorganic particles. The inorganic particles that are pulverized with a preset average particle size may be added, or after inorganic particles may be added to a solution of binder polymer, the inorganic particles may be pulverized, for example, using a ball mill method so that the inorganic particles have a preset, controlled average particle size, and then dispersed.

The method of coating the porous coating layer-forming composition on the porous substrate is not particularly limited, but it is desirable to use a slot coating or dip coating method. The slot coating is a process that applies a composition supplied through a slot die over the entire surface of a substrate, and the thickness of a coating layer can be adjusted based on a rate of flow supplied by a quantitative pump. Furthermore, the dip coating is a method that coats a substrate by dipping the substrate in a tank containing a composition, and the thickness of a coating layer can be adjusted based on the concentration of the composition and the speed at which the substrate is taken from the composition tank, and for more accurate coating thickness control, post-metering may be performed through a mayer bar after dipping.

The porous substrate coated with the porous coating layer-forming composition is dried in an oven to form a coating layer on at least one surface of the porous substrate.

The inorganic particles are closed packed or densely packed in the porous coating layer, so that they are in contact with each other and held together by the binder polymer, and thereby, interstitial volume is formed between the inorganic particles, and the interstitial volume between the inorganic particles becomes voids, which will be pores.

That is, in order to maintain the bond of the inorganic particles, the binder polymer holds the inorganic particles together, for example, the binder polymer connects and immobilizes the inorganic particles. Furthermore, the pores in the porous coating layer are voids or interstitial volume between the inorganic particles, and are a space defined by inorganic particles substantially contacting each other in the closed packed or densely packed structure of the inorganic particles.

The separator according to an embodiment of the present disclosure is shown in FIG. 1. Referring to FIG. 1, the separator includes a porous substrate 100; and a porous coating layer 200 formed on one surface of the porous substrate 100 and including alumina particles 210 and aluminum hydroxide particles 220 having a smaller average particle size than the alumina particles (binder polymer is not shown).

An electrochemical device according to an aspect of the present disclosure includes a positive electrode, a negative electrode, and a separator interposed between the positive electrode and the negative electrode, and the separator is the aforementioned separator according to an embodiment of the present disclosure.

The electrochemical device includes any type of device capable of facilitating electrochemical reactions, and specifically, the electrochemical device includes, for example, any type of primary and secondary battery, fuel cell, solar cell or capacitor such as supercapacitor. Particularly, the secondary battery is preferably a lithium secondary battery including a lithium metal secondary battery, a lithium ion secondary battery, a lithium polymer secondary battery or a lithium ion polymer secondary battery.

There is no particular limitation on the two electrodes, the positive electrode and the negative electrode, to be applied with the separator of the present disclosure, and the electrode may be manufactured by binding an electrode active material to a current collector according to common methods known in the art. Of the electrode active material, non-limiting examples of the positive electrode active material includes general positive electrode active materials commonly used in a positive electrode of electrochemical devices, and particularly, it is preferred to use lithium manganese oxide, lithium cobalt oxide, lithium nickel oxide, lithium iron oxide, or lithium composite oxide thereof. Non-limiting examples of the negative electrode active material include general negative electrode active materials commonly used in a negative electrode of electrochemical devices, and particularly, lithium intercalation materials such as lithium metal or lithium alloy, carbon, petroleum coke, activated carbon, graphite or other carbon materials are desirable. Non-limiting examples of the positive electrode current collector include foils made of aluminum, nickel or combination thereof, and non-limiting examples of the negative electrode current collector include foils made of copper, gold, nickel or copper alloy or combination thereof.

The electrolyte solution available in the electrochemical device of the present disclosure includes, but is not limited to, electrolyte solutions in which a salt is dissolved or dissociated in an organic solvent, the salt having a structure represented by, for example, $A^+B^-$ where $A^+$ is an alkali metal cation such as $Li^+$, $Na^+$, $K^+$, or combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combination thereof, and the organic solvent including propylene carbonate (PC), ethylene carbonate (EC), diethyl carbonate (DEC), dimethyl carbonate (DMC), dipropyl carbonate (DPC), dimethylsulfoxide, acetonitrile, dimethoxy ethane, diethoxy ethane, tetrahydrofuran, N-methyl-2-pyrrolidone (NMP), ethylmethyl carbonate (EMC), gamma-butyrolactone, or mixtures thereof.

The pouring of the electrolyte solution is performed in any suitable step of a battery fabrication process based on a manufacturing process and required properties of a final product. That is, the pouring of the electrolyte solution is applied before battery assembly or in the final step of battery assembly.

Hereinafter, examples are described in detail to specifically explain the present disclosure. The examples of the present disclosure, however, may be modified in many other forms, and the scope of the present disclosure should not be construed as being limited to the following examples. The examples of the present disclosure are provided to explain the present disclosure more fully to those having ordinary knowledge in the art to which the present disclosure pertains.

Example 1

10 parts by weight of PVdF-CTFE (polyvinylidenefluoride-co-chlorotrifluoroethylene) was added to 95 parts by weight of acetone, and dissolved at 50° C. for about 12 hours or more, to prepare 10 parts by weight of binder polymer solution. Alumina ($Al_2O_3$) particles having an average particle size of 0.5 μm as alumina particles and boehmite (γ-AlO(OH)) particles having an average particle size of 0.2 μm as aluminum hydroxide particles were added to the prepared binder polymer solution at a 90:10 weight ratio between alumina particles and aluminum hydroxide particles and a weight ratio of binder polymer/all inorganic particles=10/90, and dispersed to prepare a slurry.

The prepared slurry was coated on a polyethylene porous film (porosity 40%) having a thickness of 9 μm by a dip coating process, and the coating thickness was adjusted to about 5 to 6 μm to manufacture a separator.

Comparative Example 1

A separator was manufactured by the same method as example 1, except that only $Al_2O_3$ particles having an average particle size of 0.5 μm were used as inorganic particles.

Example 2

5 parts by weight of PVdF-CTFE (polyvinylidenefluoride-co-chlorotrifluoroethylene) was added to 95 parts by weight of acetone, and dissolved at 50° C. for about 12 hours or more, to prepare 10 parts by weight of binder polymer solution. Alumina ($Al_2O_3$) particles having an average particle size of 2 ran as alumina particles and boehmite (γ-AlO(OH)) particles having an average particle size of 0.2 μm as aluminum hydroxide particles were added to the prepared binder polymer solution at a 90:10 weight ratio between alumina particles and aluminum hydroxide particles and a weight ratio of binder polymer/all inorganic particles=20/80, and dispersed to prepare a slurry.

The prepared slurry was coated on a polyethylene porous film (porosity 40%) having a thickness of 20 μm by a dip coating process, and the coating thickness was adjusted to about 10 μm to manufacture a separator.

Comparative Example 2

A separator was manufactured by the same method as example 2, except that $Al_2O_3$ particles having an average particle size of 500 nm and $Al_2O_3$ particles having an average particle size of 20 nm at a weight ratio of 90:10 were used as inorganic particles.

Comparative Example 3

A separator was manufactured by the same method as example 2, except that boehmite (γ-AlO(OH)) particles having an average particle size of 500 nm and $Al_2O_3$ particles having an average particle size of 20 nm at a weight ratio of 90:10 were used as inorganic particles.

The thickness, Gurley air permeability, and thermal shrinkage in mechanical direction (MD) and transverse direction (TD) for the separators obtained in example 1 and comparative example 1 were measured, and the results are presented in Table 1.

Figure 2:
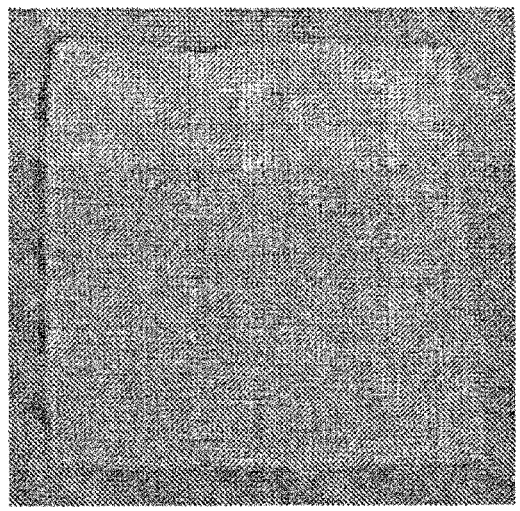
FIG. 2 and FIG. 3 are photographs of external appearance of the separators obtained at the time of the thermal shrinkage measurements of Example 1 and Comparative Example 1, respectively.
Figure 3:
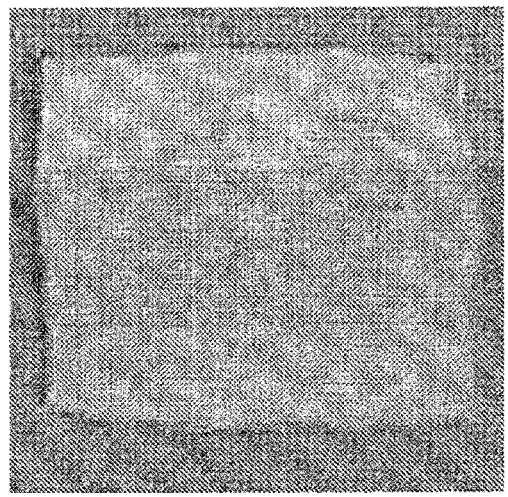

In addition, the photographs of external appearance of the separators obtained at the time of the thermal shrinkage measurements of Example 1 and Comparative Example 1 have been provided as FIG. 2 and FIG. 3, respectively.

Gurley Air Permeability (Gurley Number)

The Gurley air permeability value was measured by ASTM D726-94 method. The Gurley as used herein refers to resistance to airflow, and is measured by Gurley densometer. The Gurley air permeability value stated herein is the time (sec) for 100 cc of air to pass through 1 $in^2$ of sample under the pressure of 12.2 in $H_2O$, and is also known as Gurley number.

Thermal Shrinkage

After the separators manufactured in example 1 and comparative example 1 were tailored to 50 mm×50 mm size, interposed between A4 papers and placed in a 150° C. convection oven for 30 minutes, thermal shrinkage in the mechanical direction (MD) and transverse direction (TD) was measured. In this instance, thermal shrinkage was calculated by [(initial length−length after thermal treatment)/(initial length)×100].

TABLE 1

|  | EXAMPLE 1 | COMPARATIVE EXAMPLE 1 |
| --- | --- | --- |
| THICKNESS(μm) | 13.25 | 14.7 |
| GURLEY NUMBER(s/100 $cm^3$) | 417 | 572 |
| THERMAL SHRINKAGE (MD/TD (%) 150° C., 30 MIN | 9/9 | 47/41 |

Referring to Table 1, it could be seen that the example 1 separator having a porous coating layer including alumina particles and aluminum hydroxide particles having a smaller particle size than the alumina particles showed better effects in terms of air permeability and thermal shrinkage in MD/TD, compared to comparative example 1 using alumina particles alone.

Particularly, the porous coating layer of example 1 is 4.25 μm thick and the porous coating layer of comparative example 1 is 5.7 μm thick, so example 1 has a thinner porous coating layer than comparative example 1, but small size particles are situated in large spacing between large size particles, and thus the density of the porous coating layer is improved, and thermal contraction of the porous substrate is greatly suppressed. Through this, the use of aluminum hydroxide particles having lower density contributes to the reduced weight of the separator and the electrochemical device, and can suppress a short circuit that may occur when the electrochemical device is overheated, so that the separator with enhanced stability and the electrochemical device comprising the same will be provided.

DESCRIPTION OF REFERENCE NUMERAL

100: porous substrate,
200: porous coating layer
210: alumina particle,
220: aluminum hydroxide particle

What is claimed is:

1. A separator comprising:
   a porous substrate having a plurality of pores; and
   a porous coating layer formed on at least one surface of the porous substrate or on at least one surface of the porous substrate and some of the pores, the porous coating layer comprising a plurality of inorganic particles and a binder polymer disposed on part or all of the inorganic particles' surface to connect and immobilize the inorganic particles,
   wherein the inorganic particles comprise alumina particles and aluminum hydroxide particles having a smaller average particle size than the alumina particles,
   wherein a content ratio between the alumina particles and the aluminum hydroxide particles is from 90:10 to 97:3, and
   wherein the porous substrate is formed of polyethylene.

2. The separator according to claim 1, wherein an average particle size of the aluminum hydroxide particles is as small as 0.01 to 0.9 of an average particle size of the alumina particles.

3. The separator according to claim 1, wherein the average particle size of the alumina particles is 0.5 to 3 µm.

4. The separator according to claim 1, wherein the average particle size of the aluminum hydroxide particles is 0.05 to 0.4 µm.

5. The separator according to claim 1, wherein the aluminum hydroxide particles are at least one selected from the group consisting of boehmite (γ-AlO(OH)), pseudoboehmite (Al2O3.H2O), diaspore (α-AlO(OH)), bayerlite (α-AlO(OH)3), gibbsite (γ-AlO(OH)3), and nordstrandite (AlO(OH)3).

6. The separator according to claim 1, wherein the porous substrate has a thickness of 5 to 50 µm a pore size of 0.01 to 50 µm and a porosity of 10 to 95%.

7. The separator according to claim 1, wherein a weight ratio between the inorganic particles and the binder polymer is from 50:50 to 99:1.

8. The separator according to claim 1, wherein the binder polymer is at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

9. An electrochemical device comprising:

a positive electrode, a negative electrode, and a separator interposed between the positive electrode and the negative electrode, wherein the separator is defined in claim 1.

10. The electrochemical device according to claim 9, wherein the electrochemical device is a lithium secondary battery.

* * * * *